Patented Oct. 2, 1928.

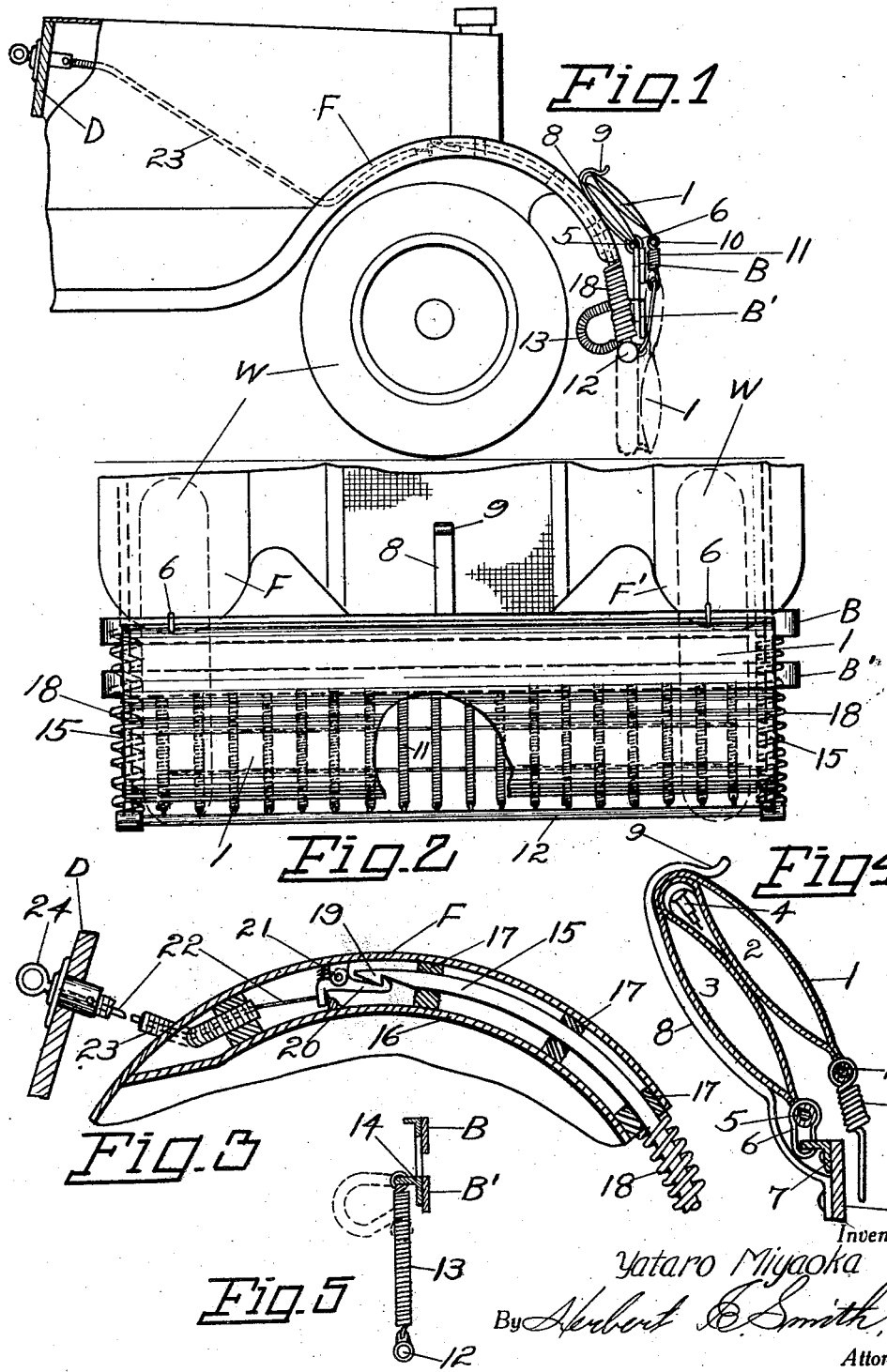

1,686,164

UNITED STATES PATENT OFFICE.

YATARO MIYAOKA, OF SPOKANE, WASHINGTON.

BUFFER FOR AUTOMOBILES.

Application filed January 24, 1928. Serial No. 249,068.

My present invention relates to improvements in buffers for automobiles designed for location at the front of the vehicle and preferably attached to the standard type of bumpers usually carried at the front of the vehicle.

The primary object of the invention is the provision of pneumatic means for cushioning the effect of impact of the bumper with a pedestrian in order to avoid as much as possible the danger of injury should the automobile equipped with the buffer of my invention strike a pedestrian. The invention involves the use of a pneumatic cushion bag and also resilient springs to assist in the cushioning effect, and the buffer is designed to be folded into normal inoperative position and carried in this position at the front of the automobile. Means are provided for releasing the folded buffer and resilient means are utilized for plunging the folded buffer into operative position so that when thus lowered the buffer will be in position to receive the impact of striking a pedestrian for the purpose of reducing as much as possible injury to the pedestrian.

The invention consists in certain novel combinations and arrangements of parts whereby the buffer is supported and controlled as will hereinafter be more fully described and claimed.

In the accompanying drawings, I have illustrated one complete example of the physical embodiment of my invention wherein the parts are combined and arranged according to the best mode I have so far devised for the practical application of the principles of my invention.

Figure 1 is a view in side elevation showing the front portion of an automobile equipped with the buffer of my invention, the latter being shown by full lines in normal position, and by dotted lines in projected or operative position;

Fig. 2 is a front elevation showing the buffer projected in position for use;

Fig. 3 is an enlarged detail sectional view taken longitudinally of one of the wheel fenders showing the release mechanism within the fender;

Fig. 4 is an enlarged transverse sectional view through the pneumatic cushion and showing its retaining parts; and Fig. 5 is a detail view showing one of the cushion springs for the pneumatic cushion.

In order that the general arrangement and relation of parts may readily be understood, I have indicated the wheels W with the fenders F and F' together with the dashboard D of an automobile. The front bumper is of a type utilizing an upper bar B and a lower bar B' and this bumper is utilized for the attachment of the buffer of my invention.

The buffer includes a pneumatic cushion or bag 1 which is adapted to fold and form two compartments 2 and 3. The cushion or bag extends transversely of the automobile in front of the radiator and the two fenders F and F' and it is provided with a filling valve 4 so that the two compartments 2 and 3 may be filled or partially filled with air and the bag is folded when the buffer is maintained in normal inoperative position.

The pneumatic bag or cushion is provided with a retaining rod 5 which is fastened at one end of the bag and extends transversely of the automobile and two links or shackles 6 are employed to attach this retaining rod to an angle bar 7 that is riveted or otherwise secured to the upper bar B of the bumper. In this manner, the pneumatic cushion or bag is anchored to the upper bar B of the bumper and in folded or inoperative position is supported above the bumper. In this normal position, the central portion of the pneumatic cushion or bag is supported by means of a retaining plate 8 that rises from the bumper and extends backwardly and upwardly and terminates in a spring hook 9 in which the folded portion of the pneumatic bag or cushion is retained. In this manner, the folded air cushion or pneumatic cushion is retained in normal position and its end portions may rest against the front part of the two fenders F and F'.

The air cushion or pneumatic cushion is designed to be plunged downwardly in front of the bumper and wheels and to occupy a position indicated in Fig. 2 where it is shown in front of the wheels W. For this purpose, one edge of the air cushion is provided with a draw bar 10 parallel with the retaining bar 5 and at the opposite ends of this draw bar are attached a pair of springs 11. The lower ends of these springs are connected to an operating bar or plunger bar 12 that also extends transversely of the automobile.

Back of the air cushion, I provide a series of spaced cushion springs 13 attached at their upper ends to an angle bar 14 which is attached to the lower bumper bar B' and at their lower ends these cushion springs are attached to the operating bar 12. In normal position, these cushion springs are bent to a U-shape as indicated in Fig. 5 but when the pneumatic buffer is plunged to operative position, these springs are extended as in Fig. 5, full lines, and occupy a position at the rear of the extended or projected or unfolded pneumatic bag 1. The springs 13 thus assist in supporting the bag should a pedestrian be struck or caught by the bag before the automobile can stop.

The operating bar 12 forms part of a plunger frame, which frame includes a pair of curved rods 15, one extending from each of the ends of the operating bar and these rods are supported in housings 16 fixed at the under sides of the fenders F and F' and provided with bearings 17 in which the rods 15 may reciprocate. Springs 18 are interposed between the housings and the operating bar and coiled about the plunger rods 15. When these plunger rods 15 are released, the springs are designed to plunge the bar 12 downwardly which in turn pulls on the springs 11, the springs 11 pull on the draw bar 10 and the folded air cushion is thus pulled forward and downwardly to operative position.

These plunger rods 15 at their upper rear ends are fashioned with latch hooks 19 and release latches 20 that are pivoted at 21 in the housings and engage these hooks and hold the plunger rods in uplifted position. Cables 22 are attached to the release latches and these cables pass rearwardly through flexible tubes 23 to a pull ring 24 on the dashboard D. The cables divide and their two branches extend to the two fenders and two housings and it will be apparent that when the pull ring 24 is pulled the two release latches 20 are moved to release the plunger rods 15 and then the springs 18 throw the air cushion into operative position.

After the buffer has been used, it may be returned to inoperative position by folding the pneumatic bag, lifting the operating rod 12, and pushing the plunger bars 15 back into their housings until they are caught by the spring pressed latches 20 and the appliance is thus held in normal inoperative position.

Having thus fully described my invention, what I claim as new and desire to secure by Letters Patent is—

1. The combination with a bumper, of a pneumatic bag loosely attached thereto and adapted to be folded, means for supporting the folded pneumatic bag, and means for plunging said bag to unfolded and operative position.

2. The combination with a bumper, of a buffer including a folded pneumatic bag, a supporting plate having a spring retaining hook for the folded bag, operating means for plunging said bag to unfolded position, means for retaining the operating means, and means for releasing the retaining means.

3. The combination with a folded pneumatic bag, of a plunger frame connected to said bag, resilient means for operating the plunger frame, a latch device for retaining the plunger frame, and means for releasing the latch device.

4. The combination with a folded air cushion having a draw bar, of an operating bar and resilient means connecting said draw bar and the operating bar, a pair of curved plunger rods rigid with the operating bar and a pair of plunger springs on said rods, means for retaining the rods in inoperative position, and means for releasing the retaining means.

5. The combination with a folded air cushion and anchoring means therefor, of a draw bar attached to said cushion, an operating bar and springs connecting said draw bar and operating bar, a pair of curved plunger rods rigid with the operating bar, a pair of housings for the curved plunger rods, a pair of springs between the operating bar and said housings, latch hooks on said rods, pivoted latches within the housings engaging said hooks, and pull cables connected to said latches.

In testimony whereof I affix my signature.

YATARO MIYAOKA.